United States Patent
Garcia et al.

(10) Patent No.: US 12,157,378 B2
(45) Date of Patent: Dec. 3, 2024

(54) PROPULSION BATTERY MOUNT SYSTEMS AND METHODS

(71) Applicant: Lyft, Inc., San Francisco, CA (US)

(72) Inventors: Alejandro Salvador Garcia, San Francisco, CA (US); Jared Mitchell Kole, San Jose, CA (US); Erica Catherine Keenan, San Francisco, CA (US); Daniela Forero Rodriguez, Sunnyvale, CA (US); Longlai Qiu, Waterloo (CA)

(73) Assignee: Lyft, Inc., San Francisco, CA (US)

( * ) Notice: Subject to any disclaimer, the term of this patent is extended or adjusted under 35 U.S.C. 154(b) by 962 days.

(21) Appl. No.: 16/836,304

(22) Filed: Mar. 31, 2020

(65) Prior Publication Data
US 2021/0305545 A1    Sep. 30, 2021

(51) Int. Cl.
*B60L 50/64*    (2019.01)

(52) U.S. Cl.
CPC .......... *B60L 50/64* (2019.02); *H01M 2220/20* (2013.01)

(58) Field of Classification Search
CPC .......... B60L 50/64; Y02E 60/10; Y02T 10/70; H01M 2220/20; H01M 10/48; H01M 10/488; H01M 50/244; H01M 50/249; H01M 2010/4278
See application file for complete search history.

(56) References Cited

U.S. PATENT DOCUMENTS

| | | | |
|---|---|---|---|
| 9,302,735 B2 * | 4/2016 | Tagaya | B62M 6/90 |
| 2010/0237585 A1 * | 9/2010 | Binggeli | B62K 19/30 |
| | | | 280/288.4 |
| 2018/0006278 A1 * | 1/2018 | Shimoda | H01M 50/202 |
| 2018/0233717 A1 * | 8/2018 | Motoyama | H01M 50/213 |
| 2020/0295327 A1 * | 9/2020 | Onishi | B60L 53/80 |
| 2020/0376983 A1 * | 12/2020 | Titus | H04W 4/40 |

FOREIGN PATENT DOCUMENTS

| | | | | |
|---|---|---|---|---|
| CN | 2417055 Y | * | 1/2001 | B60L 11/18 |
| CN | 109319035 | * | 2/2019 | B62K 19/30 |
| DE | 102010037025 | * | 1/2012 | B62J 7/04 |
| DE | 10 2019 104 238 | * | 8/2019 | B62M 6/90 |
| EP | 3 653 481 | * | 5/2020 | B62M 6/90 |

OTHER PUBLICATIONS

DE 10 2019 104 238 machine English translation (Year: 2019).*

* cited by examiner

*Primary Examiner* — Michael L Dignan
(74) *Attorney, Agent, or Firm* — Baker Botts L.L.P.

(57) ABSTRACT

Systems and methods related to propulsion battery mount assemblies for micro-mobility transit vehicles are disclosed. For example, in an embodiment the battery mount assembly includes a mounting rail having a first side comprising a contoured surface configured to align with a complementary contoured surface of a frame of a micro-mobility transit vehicle and a second side comprising a battery mounting surface opposite the first side and configured to receive a first securing assembly and a second securing assembly entirely disposed thereon and separately spaced to receive a battery pack therebetween. The battery mount assembly may be installed on the frame of a micro-mobility transit vehicle to assist in expedient replacement of battery packs that electrically power the micro-mobility transit vehicle.

20 Claims, 15 Drawing Sheets

PROPULSION BATTERY MOUNT SYSTEMS AND METHODS

TECHNICAL FIELD

One or more embodiments of the present disclosure relate generally to powering electric vehicles and more particularly to systems and methods for providing propulsion battery mount assemblies for electric vehicles.

BACKGROUND

Contemporary transportation services may incorporate a variety of different types of vehicles, including motorized or electric kick scooters, bicycles, and/or motor scooters generally designed to transport one or two people at once (collectively, micro-mobility transit vehicles). Such micro-mobility transit vehicles provide an additional dimension of transportation flexibility, particularly when such vehicles are incorporated into a dynamic transportation matching system that links requestors or riders to transit vehicles for use. Servicing a relatively extensive fleet of micro-mobility transit vehicles can present significant and cumbersome capital investment and labor (e.g., time and cost) burden to a fleet manager/servicer.

Therefore, there is a need in the art for systems and methods to reduce fleet servicer burdens associated with servicing micro-mobility fleet vehicles, particularly in the context of a dynamic transportation matching system providing transportation services incorporating such micro-mobility fleet vehicles.

SUMMARY

Techniques are disclosed for systems and methods related to propulsion battery mount assemblies for micro-mobility transit vehicles. In an example embodiment, a battery mount assembly for a micro-mobility transit vehicle includes a mounting rail. The mounting rail may include a first side having a contoured surface configured to align with a complementary contoured surface of a frame of the micro-mobility transit vehicle. The mounting rail may further include a second side having a battery mounting surface opposite the first side and configured to receive a first securing assembly and a second securing assembly entirely disposed thereon and separately spaced to receive a battery pack assembly therebetween.

In various embodiments, a method for assembling a battery mount assembly is disclosed. The method may include mounting a first securing assembly on a first portion of a battery mounting surface of a mounting rail of the propulsion battery pack assembly. The method may further include mounting a second securing assembly on a second portion of the battery mounting surface of the mounting rail. The method may further include latching a first and second end of a battery pack assembly into the first securing assembly and the second securing assembly, respectively, such that a battery pack assembly may be disposed on an intermediate portion of the battery mounting surface defined between the first portion and the second portion and securely latched by the securing assemblies.

According to one or more embodiments, a method for using a battery mount assembly is disclosed. The method may include determining, by a battery charge reading device installed on a micro-mobility transit vehicle (e.g., in a battery pack assembly), that a charge of a battery is below a predetermined threshold. The method may further include displaying, on a user interface of a device associated with the micro-mobility transit vehicle (e.g., mobile device, cockpit assembly of the vehicle, battery light emitting diode (LED) indicator, fleet operator user interface) an indication that the charge of the battery is below the predetermined threshold. The battery pack assembly may be replaced with a charged battery pack assembly. In some cases, a battery of the battery pack assembly may be replaced with a charged battery.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
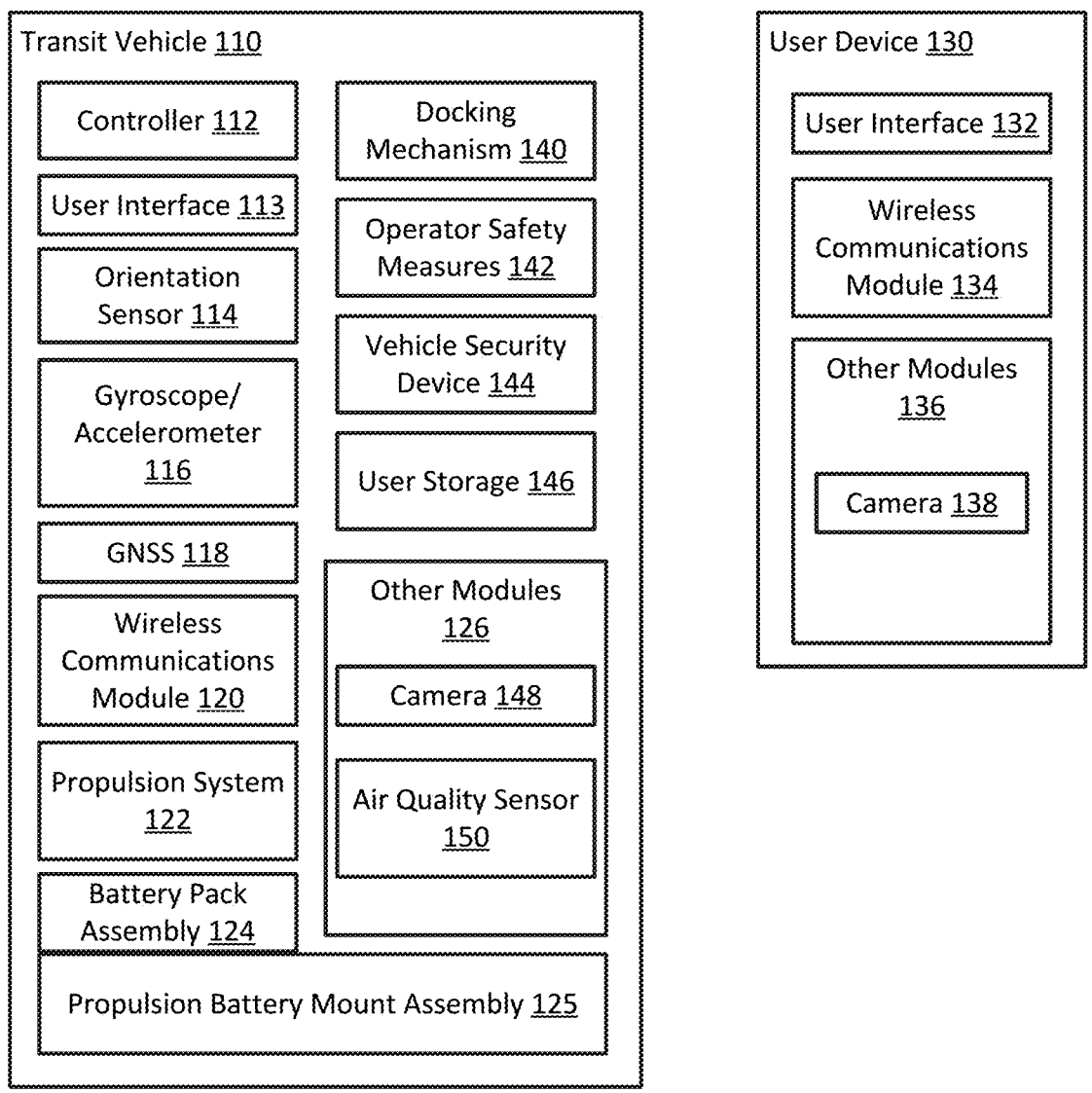
FIG. 1 illustrates a block diagram of a portion of a dynamic transportation matching system including a transit vehicle in accordance with one or more embodiments of the disclosure.

In accordance with various embodiments of the present disclosure, propulsion battery mount assemblies for micro-mobility transit vehicles and related methodologies are provided to reduce burdens associated with servicing micro-mobility transit vehicles (e.g., electric kick scooters, bicycles, motor scooters, and/or other vehicles generally designed to transport one or two people at once). For example, a battery mount assembly may include a mounting rail, where the mounting rail has a first side with a contoured surface to align (e.g., conform to, match, suit, fit, integrate) with a complementary contoured surface of a frame of a micro-mobility transit vehicle. The mounting rail may further have a second side with a battery mounting surface opposite the first side and configured to receive a first securing assembly and a second securing assembly entirely disposed thereon and separately spaced to receive a battery pack assembly therebetween. The configuration of such securing assemblies on the battery mounting surface of the mounting rail eliminates overhang of the securing assemblies, which helps to prevent vandalism and may lead to overall reduced capital investment expenditures related to maintaining an operational fleet of such transit vehicles.

In various embodiments, a method for assembling a battery mount assembly includes mounting a first securing assembly on a first portion of a battery mounting surface of a mounting rail of the propulsion battery pack assembly and mounting a second securing assembly on a second portion of the battery mounting surface of the mounting rail. The method may further include latching a first and second end of a battery pack assembly into the first securing assembly and the second securing assembly, respectively, such that a battery pack assembly may be disposed on an intermediate portion of the battery mounting surface defined between the first portion and the second portion. In some embodiments, the method may include aligning a contoured surface of a first side of the mounting rail with a complementary contoured surface of a tube of a frame of a micro-mobility transit vehicle and installing the mounting rail on the tube of the frame of the micro-mobility transit vehicle. The battery pack assembly may be electrically coupled to a propulsion system of the micro-mobility transit vehicle to provide electric powered assistance to a rider of the micro-mobility transit vehicle.

According to one or more embodiments, a method for using a battery mount assembly is disclosed. The method may include determining, by a charge reading device installed on a micro-mobility transit vehicle, that a charge of a battery of the battery pack assembly is below a predetermined threshold indicating that the battery requires a charge or replacement. The method may further include displaying, on a user interface of a device associated with the micro-mobility transit vehicle (e.g., a rider's mobile device, a cockpit assembly of the vehicle, battery light emitting diode (LED) indicator, etc.) an indication that the charge of the battery is below the predetermined threshold. The battery pack assembly may be replaced with a charged battery pack assembly, or a battery of the battery pack assembly may be replaced with a charged battery according to various embodiments.

FIG. 1 illustrates a block diagram of a portion of a dynamic transportation matching system (e.g., system 100) including a transit vehicle 110 in accordance with an embodiment of the disclosure. In the embodiment shown in FIG. 1, system 100 includes transit vehicle 110 and user device 130. In general, transit vehicle 110 may be a passenger vehicle designed to transport a single user (e.g., a micro-mobility transit vehicle) or a group of people (e.g., a typical car or truck). Although transit vehicle 110 is primarily described herein as an electric powered bicycle, transit vehicle 110 may be implemented as a motorized or electric kick scooter, a motor scooter designed to transport one or perhaps two people at once typically on a paved road, or a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a manager/servicer providing transit vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory or data storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility transit vehicles), transit vehicle 110 may include a battery mount assembly 125 having securing assemblies configured to couple (e.g., latch) a battery pack assembly 124 to a mounting rail installed on transit vehicle 110. Battery pack assembly 124 may be implemented to include one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery pack assembly 124 may be implemented with its own safety measures, such as thermal interlocks and a fire-resistant enclosure, for example, and may include one or more logic devices, sensors, and/or a display to monitor and provide visual feedback of a charge status of the battery (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of transit vehicle 110 and/or system 100. In further embodiments, other modules 126 may include a light, such as a headlight or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility transit vehicle, as described herein.

Transit vehicles implemented as micro-mobility transit vehicles may include a variety of additional features designed to facilitate transit management and user and environmental safety. For example, as shown in FIG. 1, transit vehicle 110 may include one or more of docking mechanism 140, operator safety measures 142, vehicle security device 144, and/or user storage 146, as described in more detail herein.

In particular, in some embodiments, operator safety measures 142 may be implemented as one or more of a headlight, a taillight, ambient lighting, a programmable lighting element (e.g., a multi-color panel, strip, or array of individual light elements, such as addressable light emitting diodes (LEDs), recessed and/or directional lighting, actuated lighting (e.g., articulated lighting coupled to an actuator), and/or other lighting coupled to and/or associated with transit vehicle 110 and controlled by controller 112. In other embodiments, operator safety measures 142 may include a speaker or other audio element configured to generate an audible alarm or sound to warn a rider or passersby of a detected safety concern, for example, or to inform a rider of a potential safety concern. More generally, operator safety measures 142 may be any electronic, mechanical, or electromechanical device or subsystem configured to increase the safety of a rider and/or mitigate potential harm to a rider under nominal operating conditions.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory or data storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
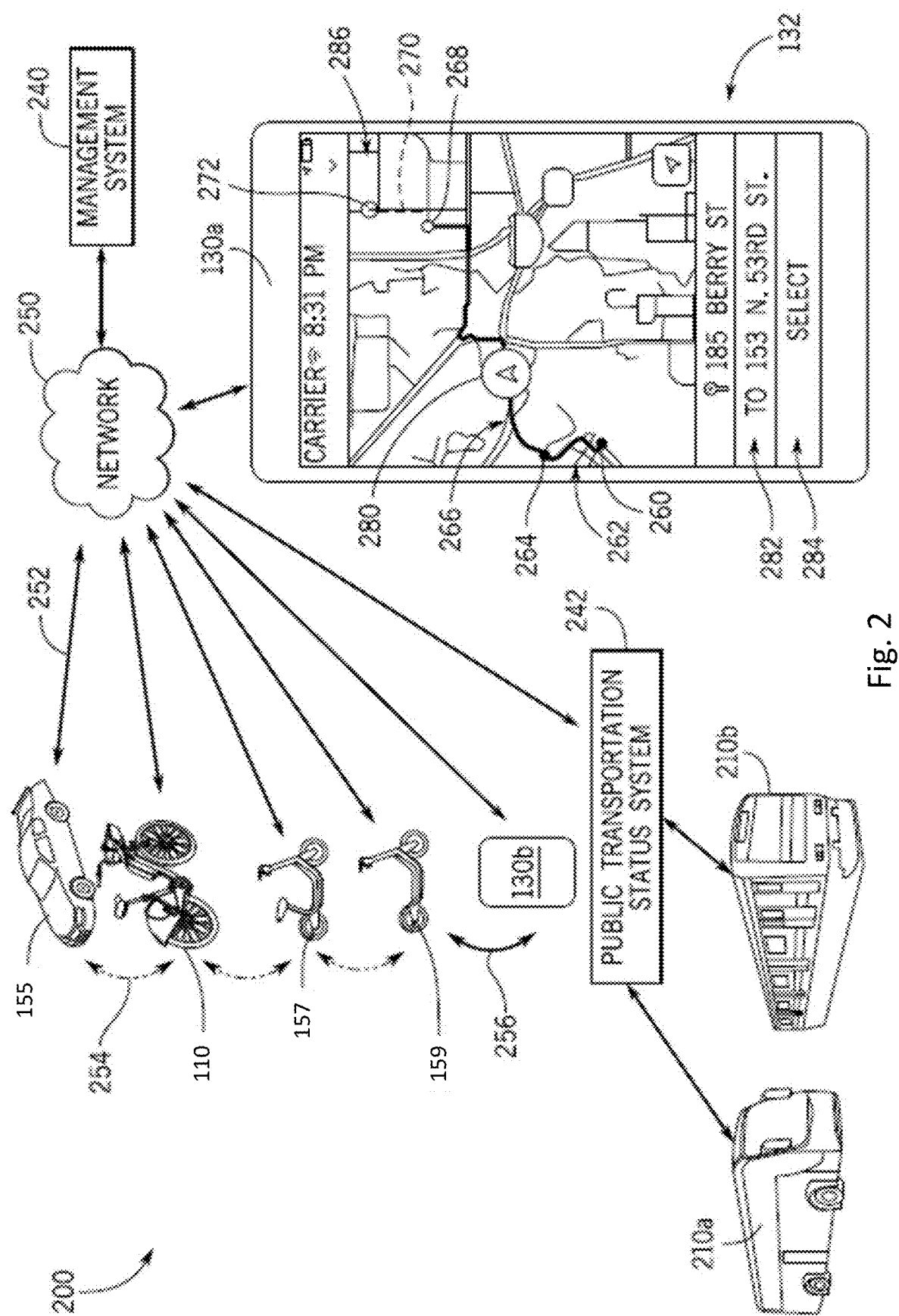
FIG. 2 illustrates a block diagram of a dynamic transportation matching system incorporating a variety of transportation modalities in accordance with one or more embodiment of the disclosure.

In FIG. 2, a requestor may use user device 130a to receive an input with a request for transportation with one or more transit vehicles 155, 110, 157, 159 and/or public transportation vehicles 210a-b. For example, the transportation request may be a request to reserve one of transit vehicles 155, 110, 157, 159. The transportation request may be transmitted to management system 240 over WAN 250, allowing management system 240 to poll status of transit vehicles 155, 110, 157, and 159 to select one of transit vehicles 155, 110, 157, and 159 to fulfill the transportation request; receiving a fulfillment notice from management system 240 and/or from the selected transit vehicle, and receiving navigation instructions to proceed to or otherwise meet with the selected transit vehicle. A similar process may occur using user device 130b, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 155, 110, 157, and 159, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 155, 110, 157, and 159, as described herein.

User device 130a in FIG. 2 includes a display of user interface 132 that shows a planned route for a user attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210a or 210b), and a micromobility route 270 (e.g., using one or more of micromobility transit vehicles 110c, 110e, and 110g) from bus stop 268 to destination 272. Also shown rendered by user interface 132 are a present location indicator 280 (indicating a present absolute position of user device 130a on street map 286), a navigation destination selector/indicator 282 (e.g., configured to allow a user to input a desired navigation destination), and a notice window 284 (e.g., used to render vehicle status data or other information, including user notices and/or alerts, as described herein). For example, a user may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a user (e.g., initially and/or while traversing a particular planned route), and a user may select or make changes to such a route through manipulation of user device 130a, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share transit vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
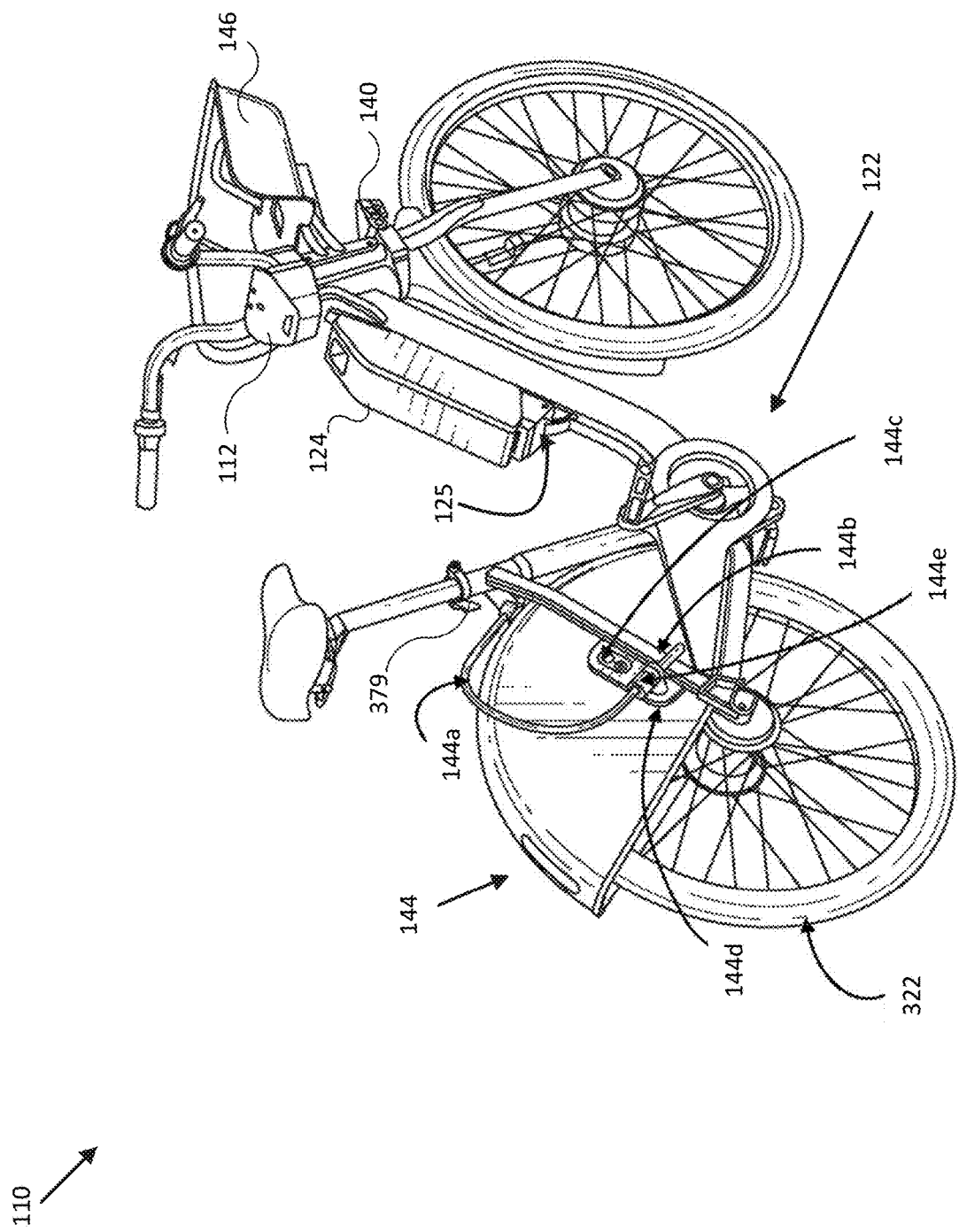
FIGS. 3A and 3B illustrate diagrams of micro-mobility transit vehicles for use in a dynamic transportation matching system in accordance with one or more embodiments of the disclosure.

FIG. 3A illustrates a diagrams of micro-mobility transit vehicle 110, which may be integrated with mobile mesh network provisioning systems in accordance with an embodiment of the disclosure. For example, transit vehicle 110 of FIG. 3A may correspond to a motorized bicycle for use that is integrated with the various elements of system 100 and may be configured to participate in dynamic transportation matching system 200 of FIG. 2. As shown, transit vehicle 110 includes controller/user interface/wireless communications module 112 (e.g., which may be integrated with a rear fender of transit vehicle 110), propulsion system 122 configured to provide motive power to at least one of the wheels (e.g., a rear wheel 322) of transit vehicle 110, battery mount assembly 125 configured to couple battery pack assembly 124 to a frame of transit vehicle 110 to power propulsion system 122 and/or other elements of transit vehicle 110, docking mechanism 140 (e.g., a spade lock assembly) for docking transit vehicle 110 at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112 may alternatively be integrated on and/or within a handlebar enclosure.

In some embodiments, vehicle security device 144 may be implemented as a wheel lock configured to immobilize rear wheel 322 of transit vehicle 110, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize transit vehicle 110 by default, thereby requiring a user to transmit a request to management system 240 (e.g., via user device 130) to use transit vehicle 110 before attempting to use transit vehicle 110. The request may identify transit vehicle 110 based on an identifier (e.g., a QR code, a barcode, a serial number, etc.) presented on transit vehicle 110 (e.g., such as by a user interface on a rear fender of transit vehicle 110). Once the request is approved (e.g., payment is processed), management system 240 may transmit an unlock signal to transit vehicle 110 (e.g., via network 250). Upon receiving the unlock signal, transit vehicle 110 (e.g., controller 112 of transit vehicle 110) may release vehicle security device 144 and unlock rear wheel 322 of transit vehicle 110.

In various embodiments, transit vehicle 110 may also be implemented with various vehicle light assemblies to increase visibility, to provide ambient lighting, and/or to provide lighted beaconing. As shown in FIG. 3A, transit vehicle 110 may include a seat post clamp assembly 379 configured to adjust between an open and closed position such that a seat post extending from a seat post tube of the frame of transit vehicle 110 may be adjusted in height and securely locked into a desired position.

In various embodiments, micro-mobility transit vehicle 110 may be implemented with a battery mount assembly 125 configured to receive a modular battery pack assembly configured to propel micro-mobility transit vehicles 110 via electric power provided to the propulsion system 122 of micro-mobility transit vehicle 110. As described herein, such battery mount assembly 125 may include various features designed to ease battery replacement, increase durability, and provide additional functionality to reduce service burdens. As such, the battery mount assembly 125 embodiments discussed herein may assist in forming a reliable and robust propulsion system and/or propulsion control system for micro-mobility transit vehicles.

Figure 3B:
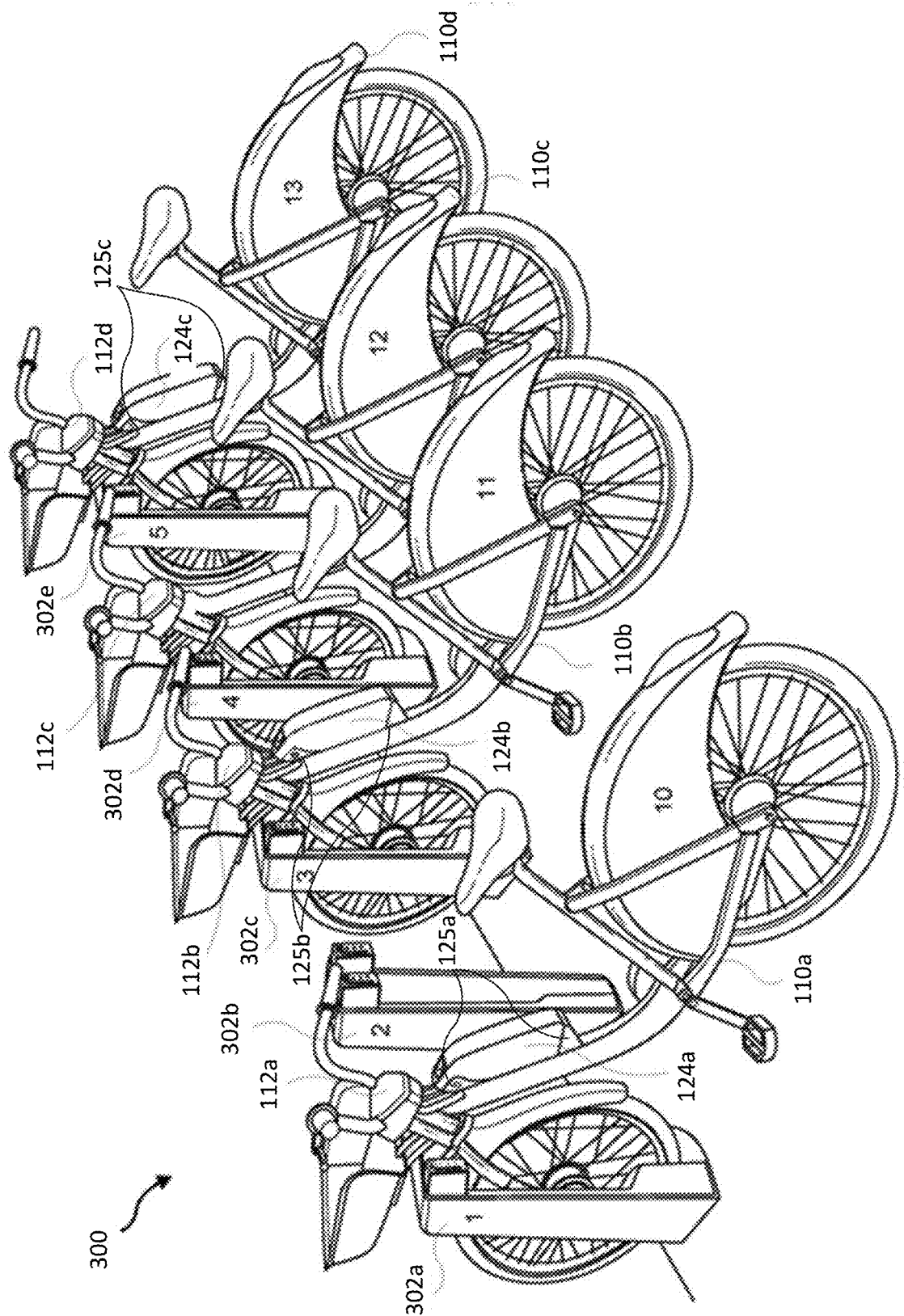

FIG. 3B illustrates a docking station 300 for docking transit vehicles (e.g., transit vehicles 110 of FIG. 3A.) in accordance with embodiments of the disclosure. As shown in FIG. 3B, docking station 300 may include multiple bicycle docks, such as docks 302a-e. For example, a single transit vehicle (e.g., any one of electric bicycles 110a-d) may dock in each of docks 302a-e of docking station 300. Each of docks 302a-e may include a lock mechanism for receiving and locking docking mechanism 140 of electric bicycles 110a-d. In some embodiments, once a transit vehicle is docked in a bicycle dock, the dock may be electronically and/or communicatively coupled to the transit vehicle (e.g., to controllers and/or wireless communications modules integrated within cockpit enclosures 112a-d of transit vehicles 110a-d) via a communication link such that the transit vehicle may be charged by the dock and the transit vehicle and the dock may communicate with each other via the communication link (e.g., similar to communications over mobile mesh network 260), as described herein.

For example, a requestor may use user device 130a to reserve a transit vehicle docked to one of bicycle docks 302a-e by transmitting a reservation request to management system 240. Once the reservation request is processed, management system 240 may transmit an unlock signal to a docked transit vehicle and/or one of docks 302a-e via network 250 and/or mobile mesh network 260. One of docks 302a-e may automatically unlock an associated lock mechanism to release the transit vehicle based, at least in part, on such unlock signal. In some embodiments, each of docks 302a-e may be configured to charge batteries (e.g., components of battery assemblies 124a-c) of electric bicycles 110a-d while electric bicycles 110a-d are docked at docks 302a-e. As shown in FIG. 3B, battery assemblies 124a-c may be secured to transit vehicles 110a, 110b, and 110d via battery mount assemblies 125a-c. In some embodiments, docking station 300 may also be configured to transmit status information associated with docking station 300 (e.g., a number of transit vehicles docked at docking station 300, charge statuses of docked transit vehicles, and/or other fleet status information) to management system 240.

Figure 3C:
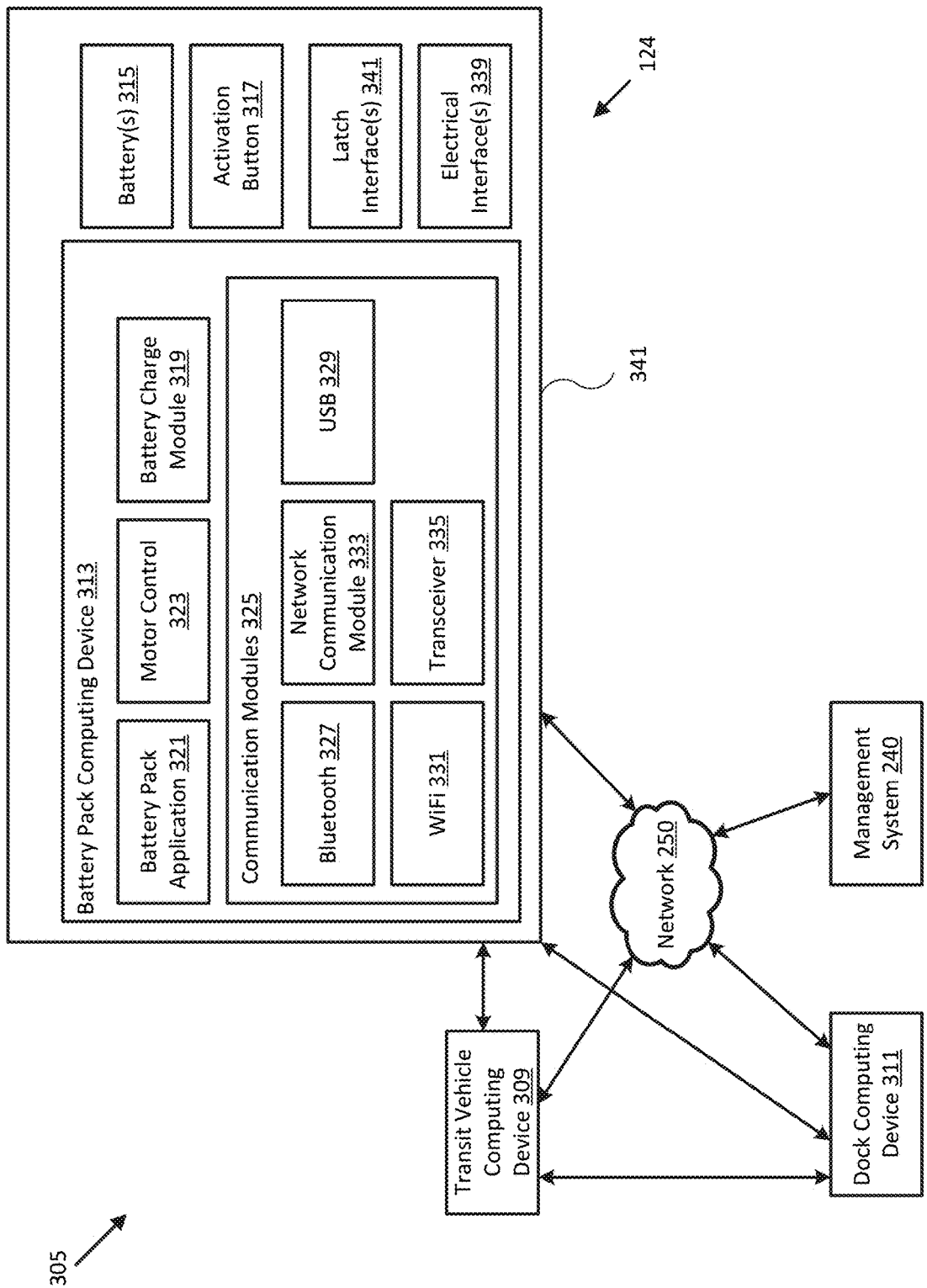
FIG. 3C illustrates an example system for determining a battery charge of a micro-mobility transit vehicle in accordance with one or more embodiments of the disclosure.

FIG. 3C illustrates a block diagram of an example system 305 for determining a state of charge of a battery of a micro-mobility transit vehicle 110 to perform needed maintenance on the micro-mobility transit vehicle 110 according to embodiments of the disclosure. For brevity, micro-mobility transit vehicle 110 may be referred to as "transit vehicle 110" in some instances. In an example embodiment dock computing device 311 may be, may be part of, or may include dock 300 of FIG. 3B.

Battery pack assembly 124 may be configured with one or more applications, devices, and/or modules that may perform one or more of the steps described herein. The battery pack assembly 124 may include a battery enclosure 341 that houses a battery pack computing device 313, a battery 315, and an activation button 317. The battery 315 may be a single battery or may be multiple batteries connected together to provide a battery source for a motor included in the transit vehicle 110 that when provided power allows for electrical-assistance for the transit vehicle 110. The activation button 317 when pressed may enable the electrical-assistance for the personal mobility vehicle.

The battery charge module 319 may be hardware, firmware, and/or software configured to provide a state of charge of the battery 315 included in the battery pack computing device 313. For example, the battery charge module 319 may provide a reading of a voltage value for the battery 315. In some implementations, the voltage value for the battery 315 may be compared with a fully charged voltage value for the battery 315 to determine (calculate) a percentage of charge remaining for the battery 315. The percentage of charge remaining for the battery 315 may be compared to a threshold value to determine one or more of if the battery 315 should be recharged, if the battery 315 has enough charge to complete a trip for the transit vehicle 110, and if the battery pack assembly 124 should be swapped with another battery pack that includes a fully charged battery.

In some implementations, the determining (calculating) of a percentage of charge remaining for the battery 315 and/or the comparing of the percentage of charge remaining for the battery 315 to the threshold value may be performed by the battery pack application 321. In some implementations, the battery pack computing device 313 may provide the battery reading(s) to the transit vehicle computing device 309. In some implementations, the transit vehicle computing device 309 may determine (calculate) the percentage of charge remaining for the battery 315 and/or may compare the percentage of charge remaining for the battery 315 to the threshold value. In some implementations, the transit vehicle computing device 309 may provide the battery reading(s) to the management system 240 to determine (calculate) the percentage of charge remaining for the battery 315 and/or to compare the percentage of charge remaining for the battery 315 to the threshold value.

In some implementations, the battery pack computing device 313 may provide the battery reading(s) to the dock computing device 311. In some implementations, the dock computing device 311 may determine (calculate) the percentage of charge remaining for the battery 315 and/or may compare the percentage of charge remaining for the battery 315 to the threshold value. In some implementations, the dock computing device 311 may provide the battery reading(s) to the management system 240 to determine (calculate) the percentage of charge remaining for the battery 315 and/or to compare the percentage of charge remaining for the battery 315 to the threshold value.

In some implementations, the battery pack computing device 313 may provide the battery reading(s) to the management system 240 to determine (calculate) the percentage of charge remaining for the battery 315 and/or to compare the percentage of charge remaining for the battery 315 to the threshold value.

The battery pack computing device 313 may include a battery pack application 321, a motor control module 323, and communication modules 325. The communication modules 325 may include a Bluetooth module 327, a Universal Serial Bus (USB) module 329, a WiFi module 331, a network communication module 333, and a transceiver module 335.

The motor control module 323 may be hardware, firmware, and/or software configured to provide one or more controls (e.g., control signals) for the motor included in the transit vehicle 110 (e.g., part of propulsion system 122 of transit vehicle 110) that when provided power can allow for electrical-assistance for the transit vehicle 110. The battery pack application 321 may be implemented in hardware, firmware, and/or software. The battery pack computing device 313 may run (execute) the battery pack application 321 as described herein to implement the controls and communications for the battery pack assembly 124.

The transit vehicle computing device 309 may be configured with one or more applications, devices, and/or modules that may perform one or more of the steps described herein. According to some embodiments, the transit vehicle computing device 309 may be a tablet computer or mobile computing device. In some examples, the transit vehicle computing device 309 may be a device suitable for temporarily mounting on a transit vehicle 110 (e.g., for use by a requestor and/or provider for a transportation matching application, a navigation application, and/or any other application suited for the use of requestors and/or providers). Additionally, or alternatively, the transit vehicle computing device 309 may be a device suitable for permanently mounting on or coupling to a transit vehicle 110 that has a transit vehicle application installed on the computing device (e.g., a transit vehicle computing device 309) to provide transportation services to transportation requestors and/or to communicate with the management system 240.

The dock computing device 311 may be configured with one or more applications, devices, and/or modules that may perform one or more of the steps described herein. For example, the dock computing device 311 may include a dock application, a dock interface module, and communication modules. The communication modules may include a Bluetooth module, a WiFi module, a network communication module, and a transceiver module. The dock interface may be hardware, firmware, and/or software configured to implement and control a dock interface. The dock application may be implemented in hardware, firmware, and/or software. The dock computing device 311 may run (execute) the dock application as described herein to implement the controls, interfaces, and communications for the dock computing device 311.

The transit vehicle computing device 309, the dock computing device 311, and the battery pack computing device 313 may be any suitable type of computing device as described herein. For example, the transit vehicle computing device 309 may be mounted on or otherwise coupled to a micro-mobility transit vehicle 110 as shown, for example, in FIG. 3A (i.e., controller 112).

The management system 240 may be configured with one or more applications, devices, repositories, and/or modules that may perform one or more of the steps described herein. The management system 240 may include a micro-mobility transit vehicle database, a micro-mobility transit vehicle management module, a transit vehicle blocker module, a dynamic transportation matching system application, and communication modules. The communication modules may include a WiFi module, a network communication module, and a transceiver module.

The management system 240 may represent any computing system and/or set of computing systems capable of matching transportation requests. As described, the management system 240 may be in communication with the transit vehicle computing device 309. In some implementations, the management system 240 may be in communication with more than one (e.g., two or more) transit vehicle computing devices coupled to respective transit vehicles. In these implementations, the management system 240 may also be in communication with more than one (e.g., two or more) battery pack computing devices coupled to the respective transit vehicles. As described, the management system 240 may be in communication with the dock computing device 311. In some implementations, the management system 240 may be in communication with more than one (e.g., two or more) dock computing devices.

The WiFi modules discussed in reference to FIG. 3C, including WiFi module 331, may be hardware, firmware, and/or software configured to implement WiFi communications with (between) WiFi enabled devices. Each WiFi module may interface with a WiFi antenna included in the system or device that includes the WiFi module.

The Bluetooth modules discussed in reference to FIG. 3C, including Bluetooth module 327 may be hardware, firmware, and/or software configured to implement Bluetooth communications with (between) Bluetooth enabled devices. The transceiver modules discussed in reference to FIG. 3C, including transceiver module 335, may include hardware and/or software and may be configured to implement wireless communications with (between) computing devices and systems that are wirelessly interfaced with or connected to a cellular telecommunications network.

The network communication modules discussed in reference to FIG. 3C, including network communication module 333, may be hardware, firmware, and/or software configured to implement wired and/or wireless communications with (between) computing devices and systems connected to or interfaced with a network (e.g., network 250). The USB modules discussed in reference to FIG. 3C, including USB module 329 may be hardware, firmware, and/or software configured to implement USB communications with (between) USB enabled devices.

The battery pack computing device 313 may interact/interface with the transit vehicle computing device 309, the dock computing device 311, and/or a management system 240. In some implementations, the battery pack computing device 313 may establish direct communications with the transit vehicle computing device 309. In some implementations, the battery pack computing device 313 may establish direct communications with the dock computing device 311. In some implementations, the battery pack computing device 313 may establish communications with the management system 240 by way of network 250.

The transit vehicle computing device 309 may interact/interface with the dock computing device 311, the battery pack computing device 313, and/or the management system 240. In some implementations, the transit vehicle computing device 309 may establish direct communications with the battery pack computing device 313. In some implementations, the transit vehicle computing device 309 may establish direct communications with the dock computing device 311. In some implementations, the transit vehicle computing device 309 may establish communications with the dock computing device 311 by way of a network 250. The transit vehicle computing device 309 may establish communications with the management system 240 by way of the network 250.

The dock computing device 311 may interact/interface with the management system 240, the transit vehicle computing device 309, and/or the battery pack computing device 313. In some implementations, the dock computing device 311 may establish direct communications with the battery pack computing device 313. In some implementations, the dock computing device 311 may establish direct communications with the transit vehicle computing device 309. In some implementations, the dock computing device 311 may establish communications with the transit vehicle computing device 309 by way of the network 250. The dock computing device 311 may establish communications with the management system 240 by way of the network 250.

In some implementations, the battery pack computing device 313 using one or more communication modules 325 may establish communications with the transit vehicle computing device 309 by way of one or more of communication modules 325. In some implementations, the transit vehicle 110 may not be parked and/or locked in a dock and may be considered dockless. In some implementations, the transit vehicle 110 may be parked and/or locked in a dock. A battery pack application 321 may send battery information to the transit vehicle computing device 309. The transit vehicle computing device 309 may provide the battery information to the management system 240 by way of the network 250.

The battery pack computing device 313 may use one or more communication modules 325 to establish communications with the transit vehicle computing device 309 by way of one or more communication modules 325. For example, the battery pack computing device 313 may establish direct wireless communication with the transit vehicle computing device 309 using Bluetooth communication protocols. For example, the battery pack computing device 313 may establish direct wireless communication with the transit vehicle computing device 309 using, for example, WiFi communication protocols. For example, the battery pack computing device 313 may establish direct communication with the transit vehicle computing device 309 using Universal Serial Bus (USB) communication protocols. In some implementations, the battery pack computing device 313 may establish communication with the management system 240 by way of the network 250 using communication protocols implemented between network communication modules.

In some implementations, the battery pack computing device 313, using one or more communication modules 325, may establish communications with the dock computing device 311. In these implementations, the transit vehicle 110 may be docked (parked and/or locked) in a dock as shown, for example, in FIG. 3B. In some implementations, referring to FIG. 3B, a battery pack application 321 may send battery information by way of the communicative connection between the battery pack computing device 313 and the dock computing device 311. A dock application of dock computing device 311 may provide the battery information to the management system 240 by way of the network 250.

In one or more embodiments, the transit vehicle computing device 309 may determine a state of charge of the battery 315 included in the battery pack assembly 124 based on information and data received from the battery pack computing device 313. The transit vehicle computing device 309 may provide the state of charge of the battery 315 to the management system 240. The management system 240 may store the state of charge of the battery 315 in a transit vehicle status database.

In various embodiments, transit vehicle computing device 309 may include a blocker module configured to use the state of charge of the battery 315 of the transit vehicle 110 to determine if the transit vehicle 110 is available for use. In some implementations, the blocker module may decide to block use of the transit vehicle 110 until the battery 315 (and in some implementations the battery pack assembly 124) can be swapped out with another battery or charged. The blocker module may update the micro-mobility transit vehicle database entry in the transit vehicle status database via communication with management system 240 to indicate that the transit vehicle 110 is not available for use in completing a trip. The management system 240 may access the transit vehicle status database when determining an availability and location of transit vehicle 110 for possible use in completing a trip.

Figure 4:
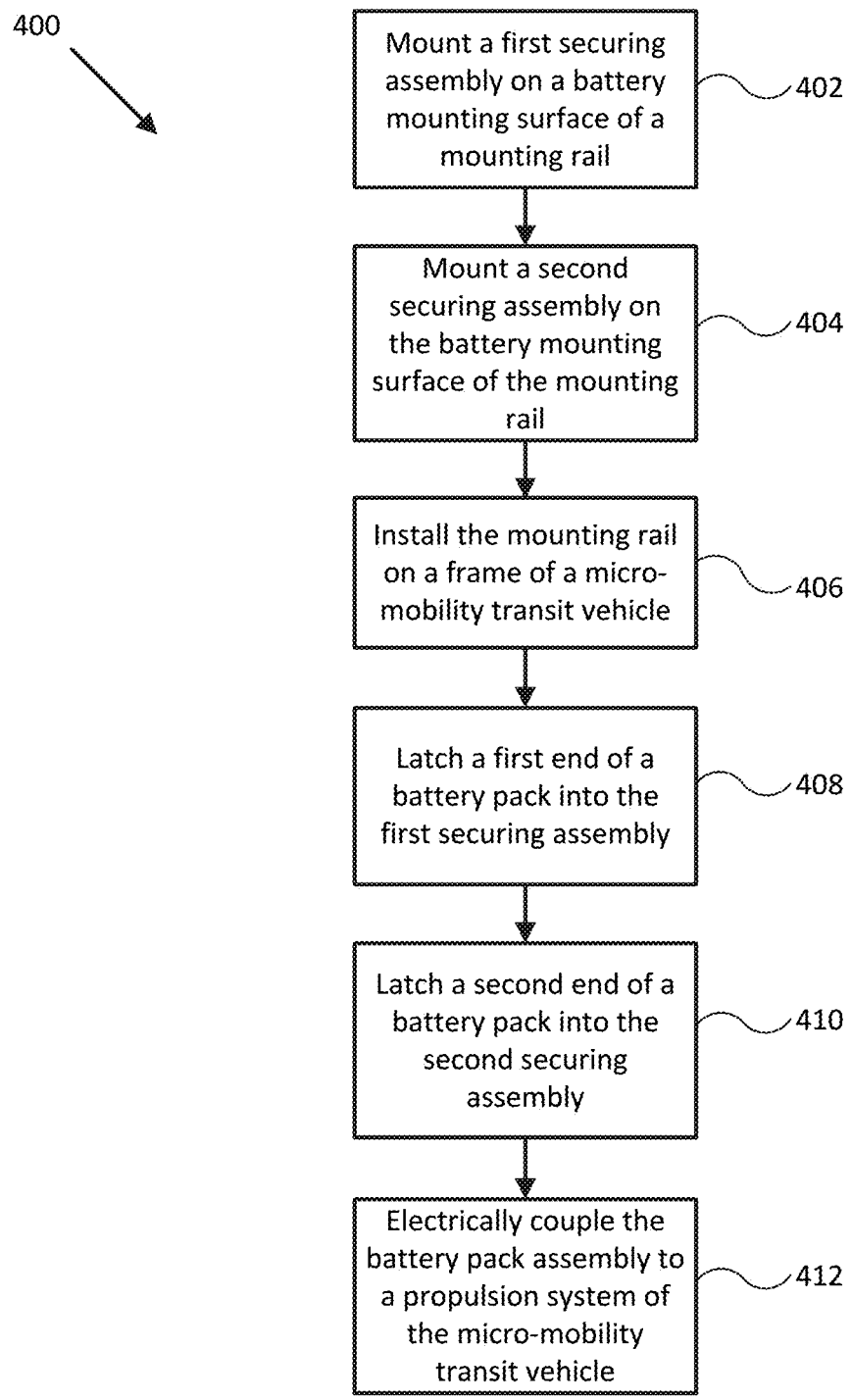
FIG. 4 illustrates a flow diagram of a process for assembling a battery mount assembly and installing the propulsion battery mount assembling on a micro-mobility transit vehicle in accordance with one or more embodiments of the disclosure.

FIG. 4 illustrates a flow diagram of a process 400 for assembling and installing a battery mount assembly 125 in accordance with one or more embodiments of the disclosure.

It should be appreciated that any step, sub-step, sub-process, or block of process 400 may be performed in an order or arrangement different from the embodiments illustrated by FIG. 4. For example, in other embodiments, one or more blocks may be omitted from or added to the process. For illustrative purposes, process 400 is described in reference to FIGS. 5A-5I but the following description of process 400 may generally be applied to the additional figures of the disclosure. It is noted that "first," "second," etc. may be used for explanatory purposes as labels for nouns that they precede in the disclosure and do not necessarily imply any type of ordering (e.g., spatial, temporal, logical, cardinal, etc.).

Figure 5A:
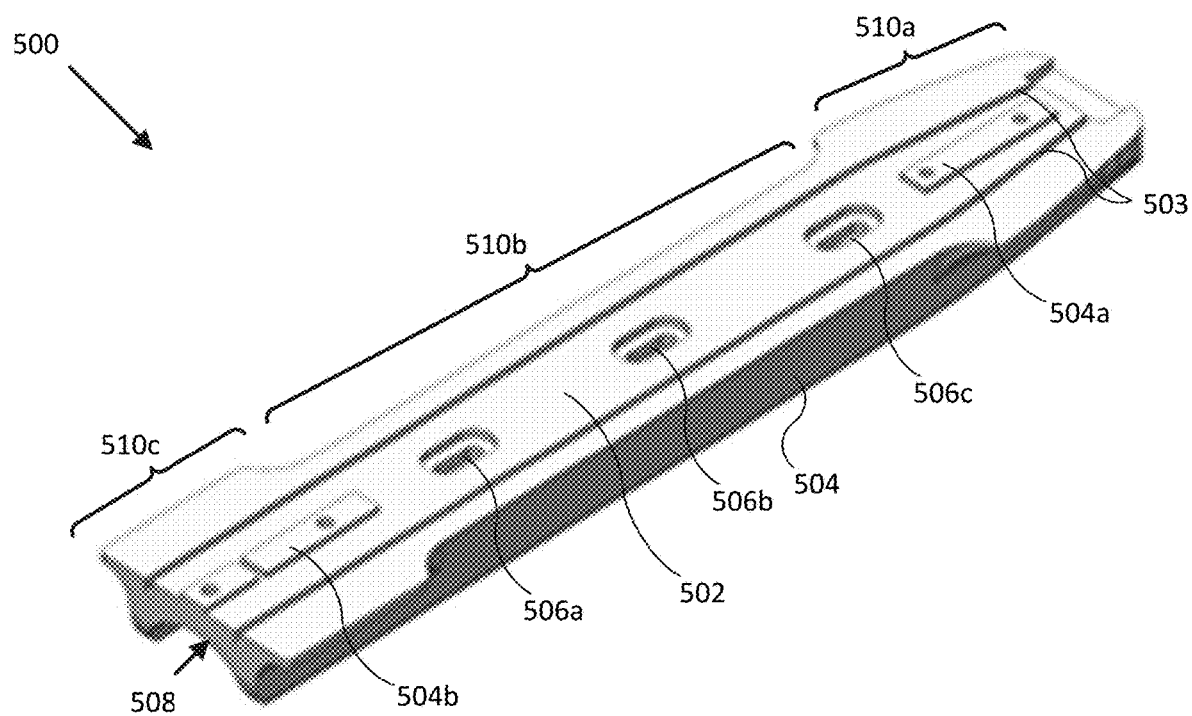
FIGS. 5A-5I illustrate various components of a battery mount assembly and assembly and installation steps of the propulsion battery mount assembling in accordance with one or more embodiments of the disclosure.
Figure 5B:
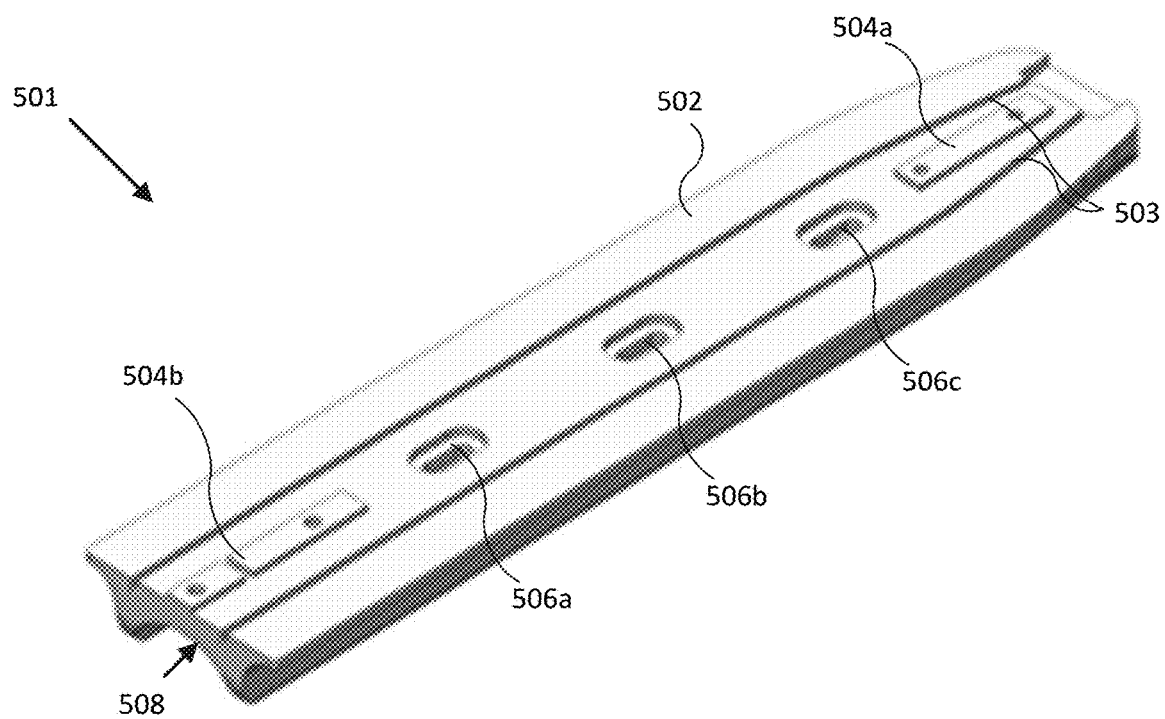

At block 402 of process 400, a first securing assembly 512 may be mounted on a battery mounting surface 502 of a mounting rail 500. Example mounting rails 500 and 501 according to various embodiments of the present disclosure are illustrated in FIGS. 5A and 5B. In the embodiment shown in FIG. 5A, mounting rail 500 includes battery mounting surface 502, mounting through-holes 506a-c, securing assembly mounting interfaces 504a and 504b, contoured surface 508, scalloped notches (one of which is labeled scalloped notch 504), and channels 503. In the embodiment shown in FIG. 5B, mounting rail 501 includes battery mounting surface 502, mounting through-holes 506a-c, securing assembly mounting interfaces 504a and 504b, contoured surface 508, and channels 503. Although reference is primarily made to mounting rail 500 with respect to various steps and processes described in the disclosure, the steps and processes may generally apply with respect to mounting rail 501.

As shown in the embodiment of FIG. 5A, mounting surface 502 may have a first portion 510a, second portion 510c, and an intermediate portion 510b between the first portion 510a and second portion 510c. Mounting surface 502 may be on a side of mounting rail 500 opposite to a side of contoured surface 508. In various embodiments, mounting rail 500 may extend substantially longitudinally along contoured surface 508. Channels 503 may be longitudinally defined in mounting surface 502. In some embodiments, channels 503 may be protective conduits for wires that extend between securing assemblies disposed on mounting surface 502. For example, wires extending from a second securing assembly may be disposed within channels 503 and electrically couple to a first securing assembly to provide power to the first securing assembly to operate a latch of the first securing assembly as further discussed below. In various embodiments, channels 503 may be used as water conduits that allow water (e.g., rain water) to run off the mounting surface 502 and away from a battery pack assembly 124.

Figure 5C:
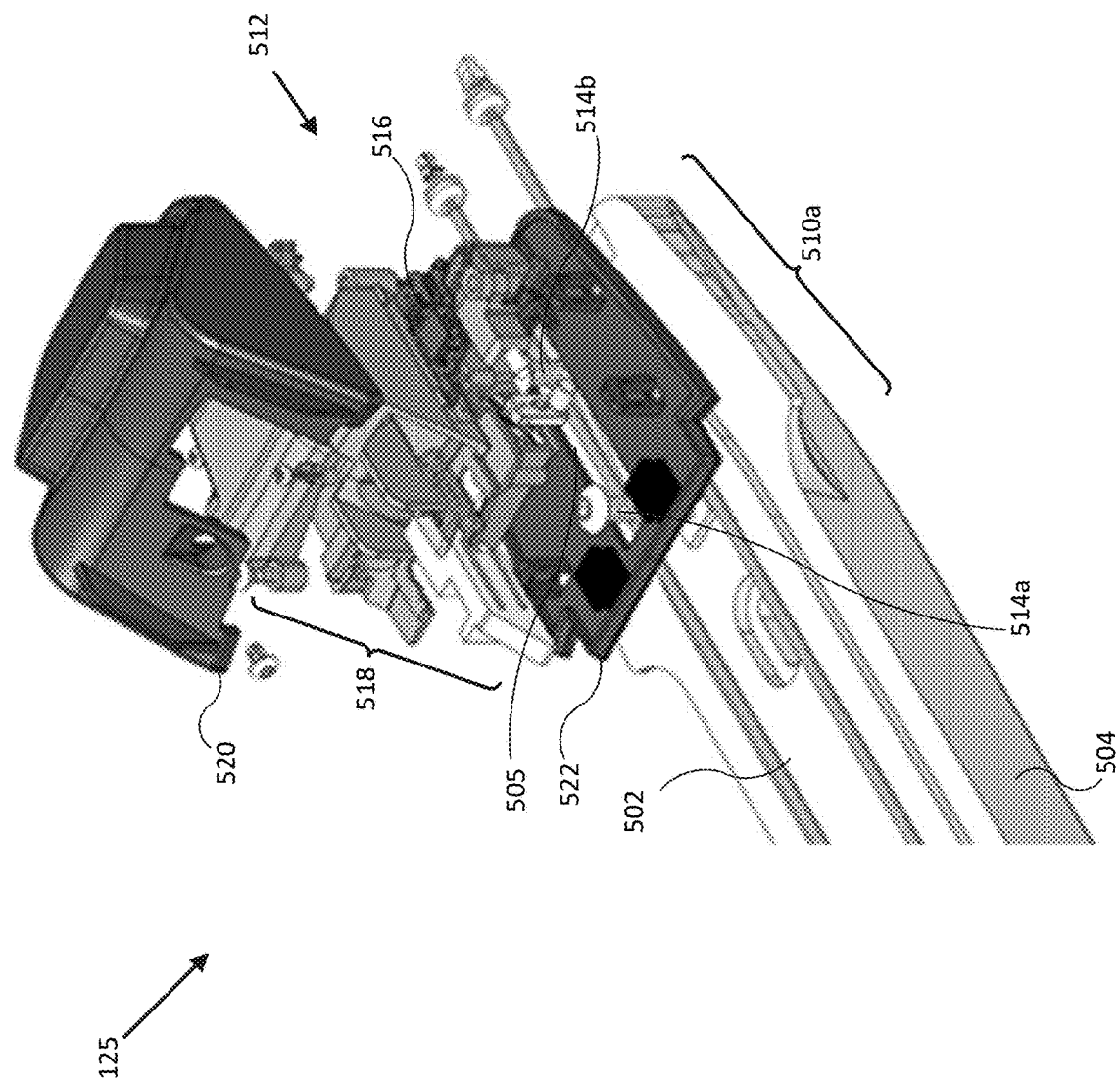

As shown in FIG. 5C, first portion 510a of mounting surface 502 may extend laterally such that first securing assembly 512 may be entirely disposed on first portion 510a during the mounting performed at block 402. In this regard, the surface defined by first portion 510a may be shaped to receive first securing assembly 512 such that first securing assembly 512 does not extend beyond bounds defined by first portion 510a. Securing assembly mounting interface 504a may be configured to receive fasteners 514a and 514b of first securing assembly 512 to securely mount first securing assembly 512 to first portion 510a. In this regard, fasteners 514a and 514b may be inserted through slot 505 provided in a mounting plate 522 of first securing assembly 512 to secure mounting plate 522, and consequently first securing assembly 512, to first portion 510a of mounting surface 502.

As further shown in FIG. 5C, first securing assembly 512 may include a printed circuit board 516. Printed circuit board 516 may include various electronic components such as a controller configured to electromechanically control a latch 518 of first securing assembly 512. For example, latch 518 may be an electromechanical latch comprising various components and configured to latch and release a battery pack assembly into first securing assembly 512. Printed circuit board 516 may further include a communications module configured to receive a wireless communication comprising instructions for the controller to latch or release latch 518. In one embodiment, the communication module may be configured to receive a wireless communication such as a near-field communication (NFC) tap, Bluetooth communication, ZigBee communication, WiFi communication, and/or infrared communication from a mobile device to control operation of latch 518. In further embodiments, the communication module may be configured to receive wireless communications originating from a fleet service operating server such as management system 240. In an example use case, a technician may perform an NFC tap (or other wireless communication) to first securing assembly 518, where the NFC tap may include an encrypted key that may be decrypted by the communication module and read by the controller to latch or release latch 518.

First securing assembly 512 may further include a cover plate 520 configured to couple to mounting plate 522 and enclose internal components of first securing assembly 512 such as latch 518 and printed circuit board 516 in a space defined therebetween.

Figure 5D:
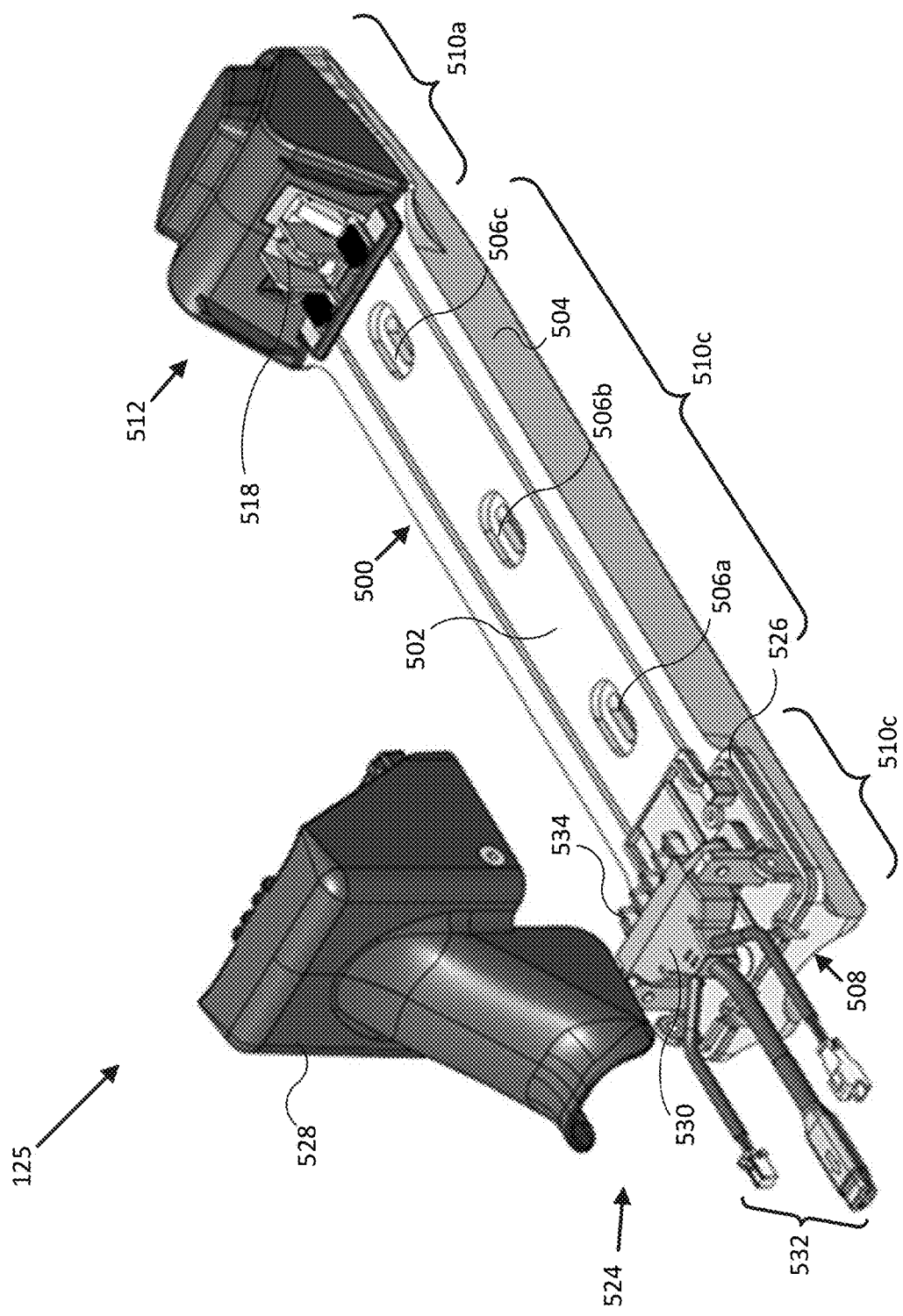

At block 404 of process 400, a second securing assembly 524 may be mounted on the battery mounting surface 502 of the mounting rail 500. For example, as shown in FIG. 5D, second portion 510c of mounting surface 502 may extend laterally such that second securing assembly 524 may be entirely disposed on second portion 510c during the mounting step performed at block 404. In this regard, the surface defined by second portion 510c may be shaped to receive second securing assembly 524 such that second securing assembly 524 does not extend beyond bounds defined by second portion 510c.

Securing assembly mounting interface 504b shown in FIGS. 5A and 5B may be configured to receive fasteners of second securing assembly 524 to securely mount second securing assembly 524 to second portion 510c. For example, the fasteners may be inserted through slots provided in a mounting plate 526 of second securing assembly 524 to secure mounting plate 526, and consequently second securing assembly 524, to second portion 510c of mounting surface 502.

Second securing assembly 524 may include a wiring harness 530 configured to electrically couple a battery pack assembly 124 to a propulsion system 122 of the micro-mobility transit vehicle 110 via one or more wires 532 that may extend into a frame of the micro-mobility transit vehicle 110 and connect to the electric-powered propulsion system 122. For example, electrical interface 534 may be configured to receive a complementary battery electrical interface of the battery pack assembly 124 to provide an electrical connection between the battery pack assembly 124, one or more wires, and the propulsion system 122.

Second securing assembly 524 may include a cover plate 528 configured to couple to a mounting plate 526 of second securing assembly 524 and enclose internal components of second securing assembly 524. Second securing assembly 524 may include a latch in some cases. For example, the latch of second securing assembly 524 may be similar to latch 518 in that it may be an electromechanical latch configured to latch and release a battery pack assembly into second securing assembly 524.

At block 406 of process 400, mounting rail 500 may be installed on a frame of the micro-mobility transit vehicle 110. Although installing the mounting rail 500 on the frame of the micro-mobility transit vehicle 110 is discussed at block 406, installing the mounting rail 500 on the frame of the micro-mobility transit vehicle 110 may generally be performed at any time prior to latching in the battery pack assembly 124 to the securing assemblies 512 and 524. However, various techniques for installing the mounting rail 500 to the frame of the micro-mobility transit vehicle 110 allow for installation after latching the battery pack assembly 124 to the securing assemblies 512 and 524, for example, such as when an adhesive is used to install the mounting rail on the frame of the micro-mobility transit vehicle 110.

Figure 5E:
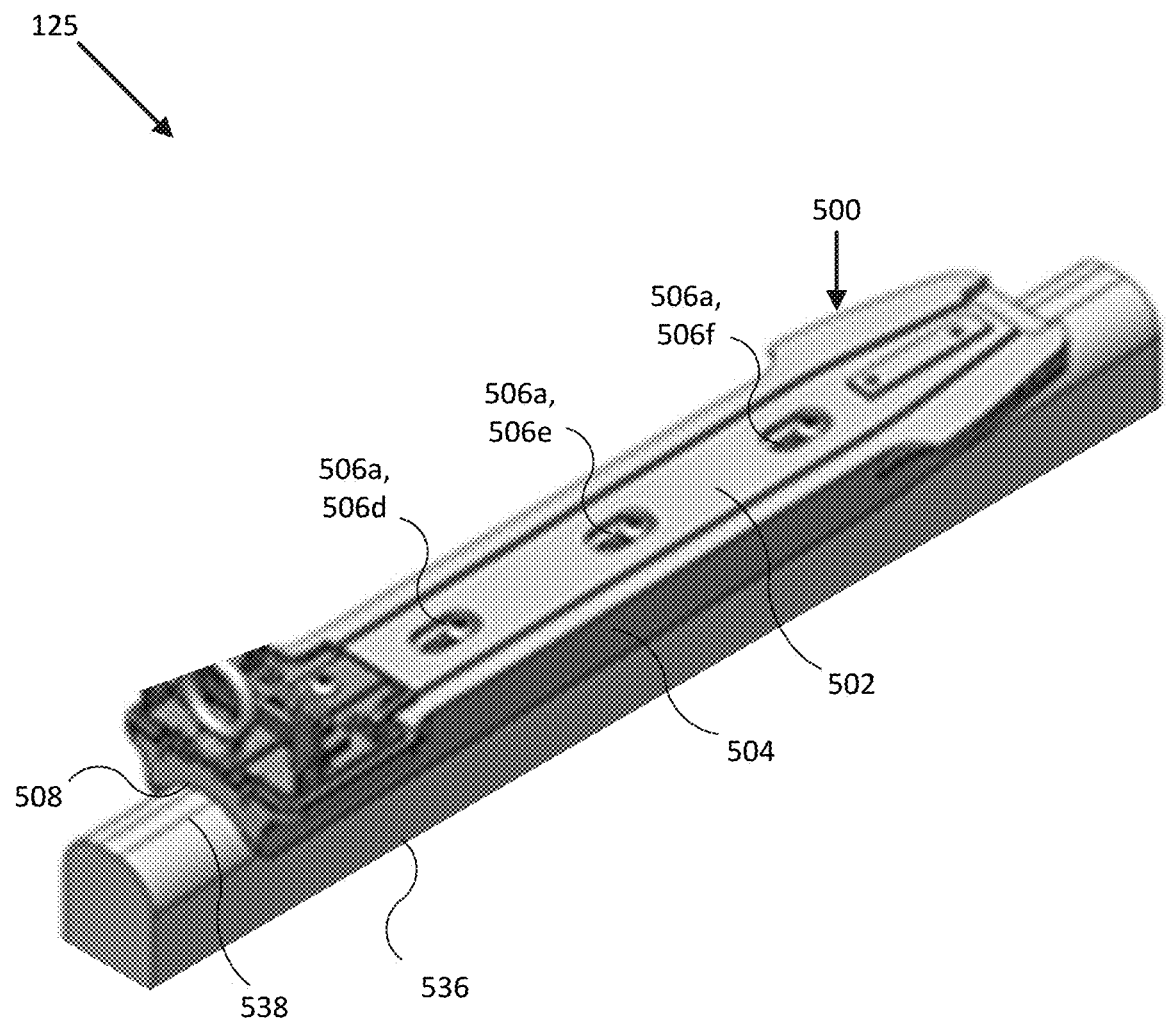
Figure 5F:
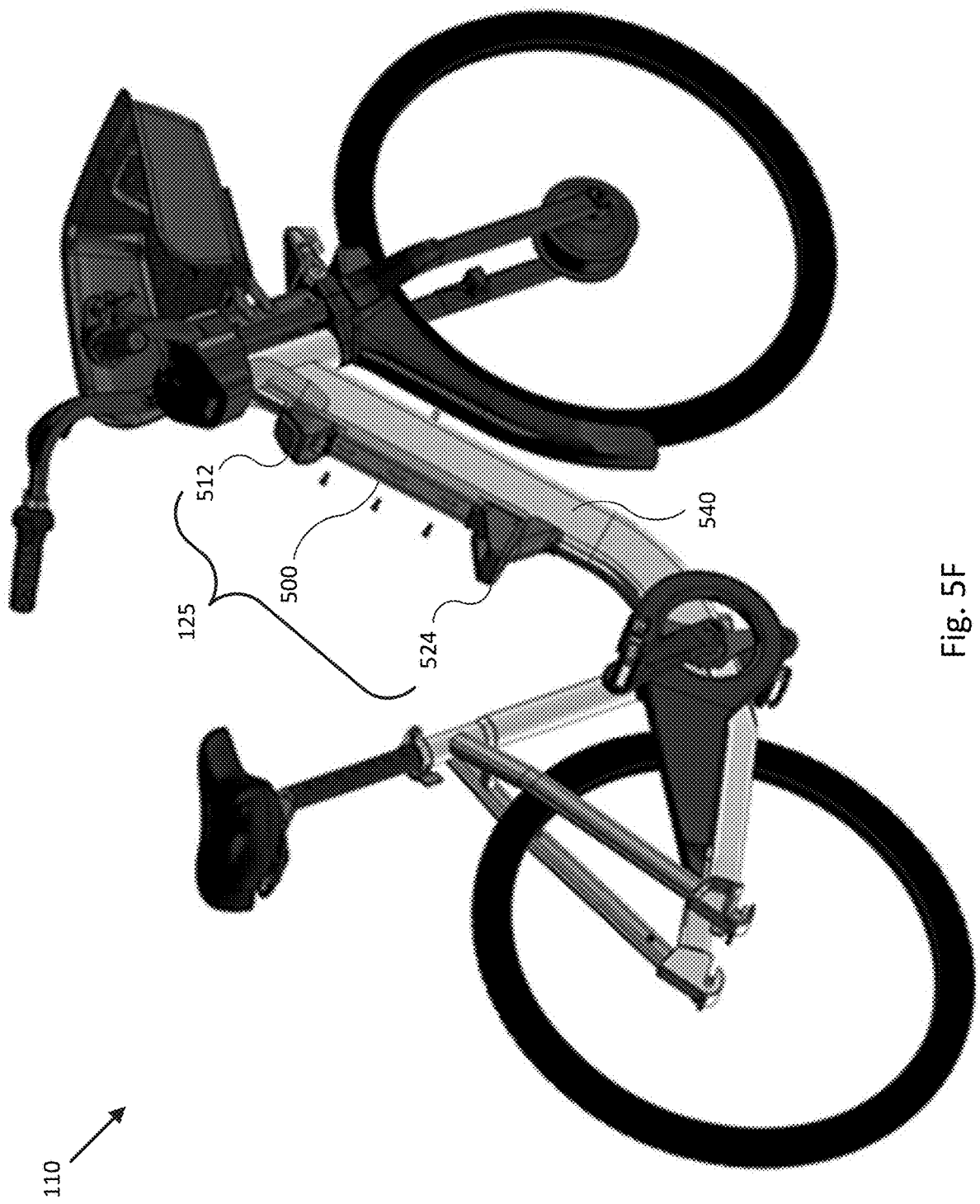
Figure 5G:
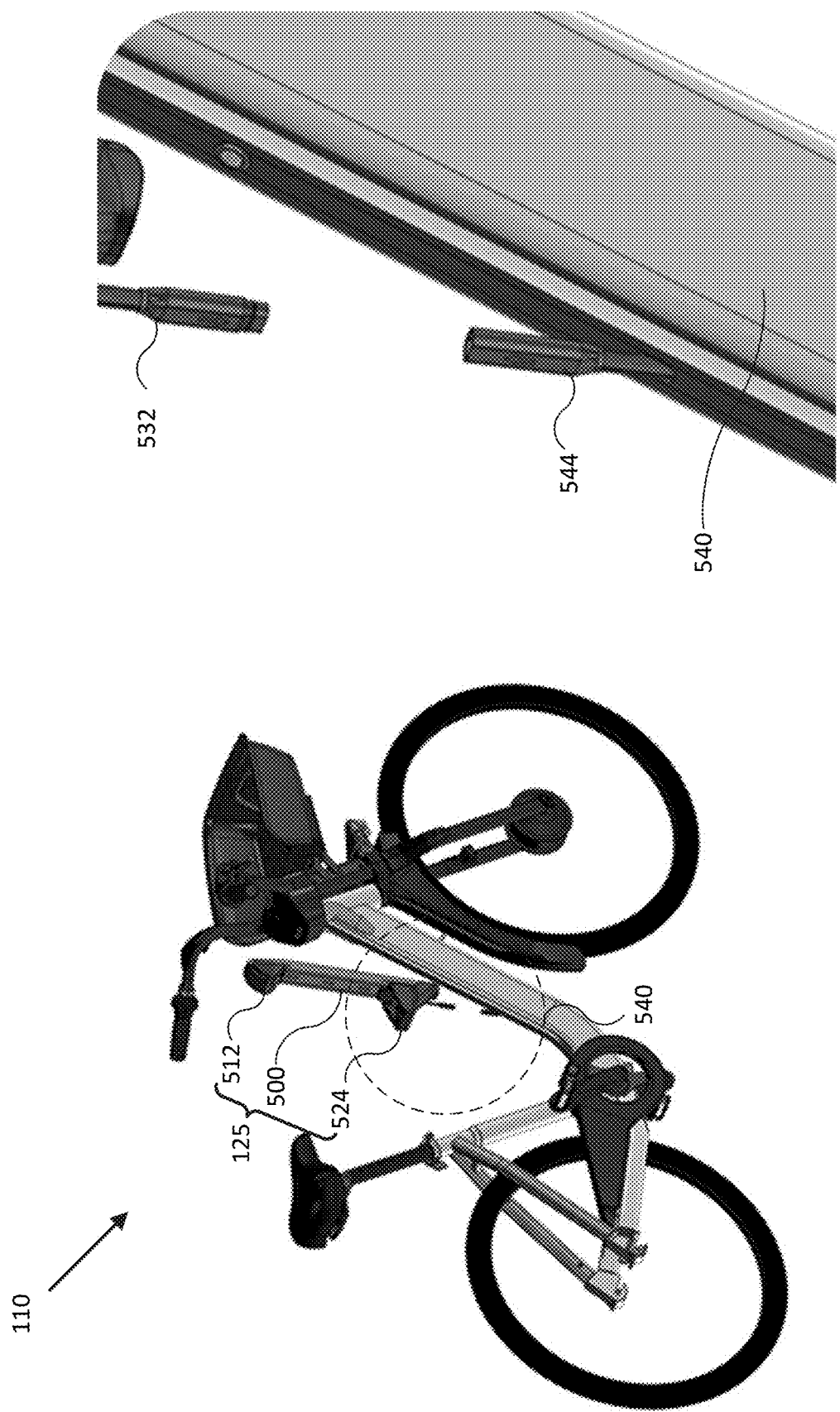

Referring now to FIG. 5E, mounting rail 500 may be installed on frame 536 by inserting fasteners through-holes 506a-506c of mounting rail 500 to be received by complementary threaded holes 506d-f of frame 536 of the micro-mobility transit vehicle 110. Contoured surface 508 of mounting rail 500 may be configured to align with a complementary contoured surface 538 of frame 536. For example, the contoured surface 508 and complementary contoured surface 538 of frame 536 may be substantially arcuate to facilitate their alignment for installation. In other examples, contoured surface 508 and complementary contoured surface 538 may be polygonal. In other words, contoured surface 508 may take various forms/shapes to suit complementary contoured surface 538 such that there are zero or minimal gaps between the two surfaces. It is noted that frame 536 shown in FIG. 5E is only a portion of a frame of a micro-mobility transit vehicle 110 and is presented for illustrative purposes. For example, frame 536 may be a component of a frame of the micro-mobility transit vehicle 110 such as a top tube, down tube, seat tube, heat tube, seat post, seat stay, chain stay, fork, stem, or any other part of the frame suitable to receive mounting rail 500. In the example embodiment shown in FIG. 5F, mounting rail 500 is installed on a downtube 540 of a micro-mobility transit vehicle 110, according to various embodiments In some embodiments, the one or more wires 532 of wiring harness 530 of second securing assembly 524 may be electrically coupled to a propulsion system 122 of the micro-mobility transit vehicle 110. As shown in FIG. 5G, the one or more wires 532 may be electrically coupled to the propulsion system 122 of the micro-mobility transit vehicle 110 via a wire 544 before or after installing the mounting rail 500 on the frame 536 of the micro-mobility transit vehicle 110 according to various embodiments according to one or more embodiments. Wire 544 may extend into the frame 536 of the micro-mobility transit vehicle 110 to connect to the propulsion system 122 in some embodiments or may extend into a wiring conduit installed on the frame 536 of the micro-mobility transit vehicle 110.

Figure 5H:
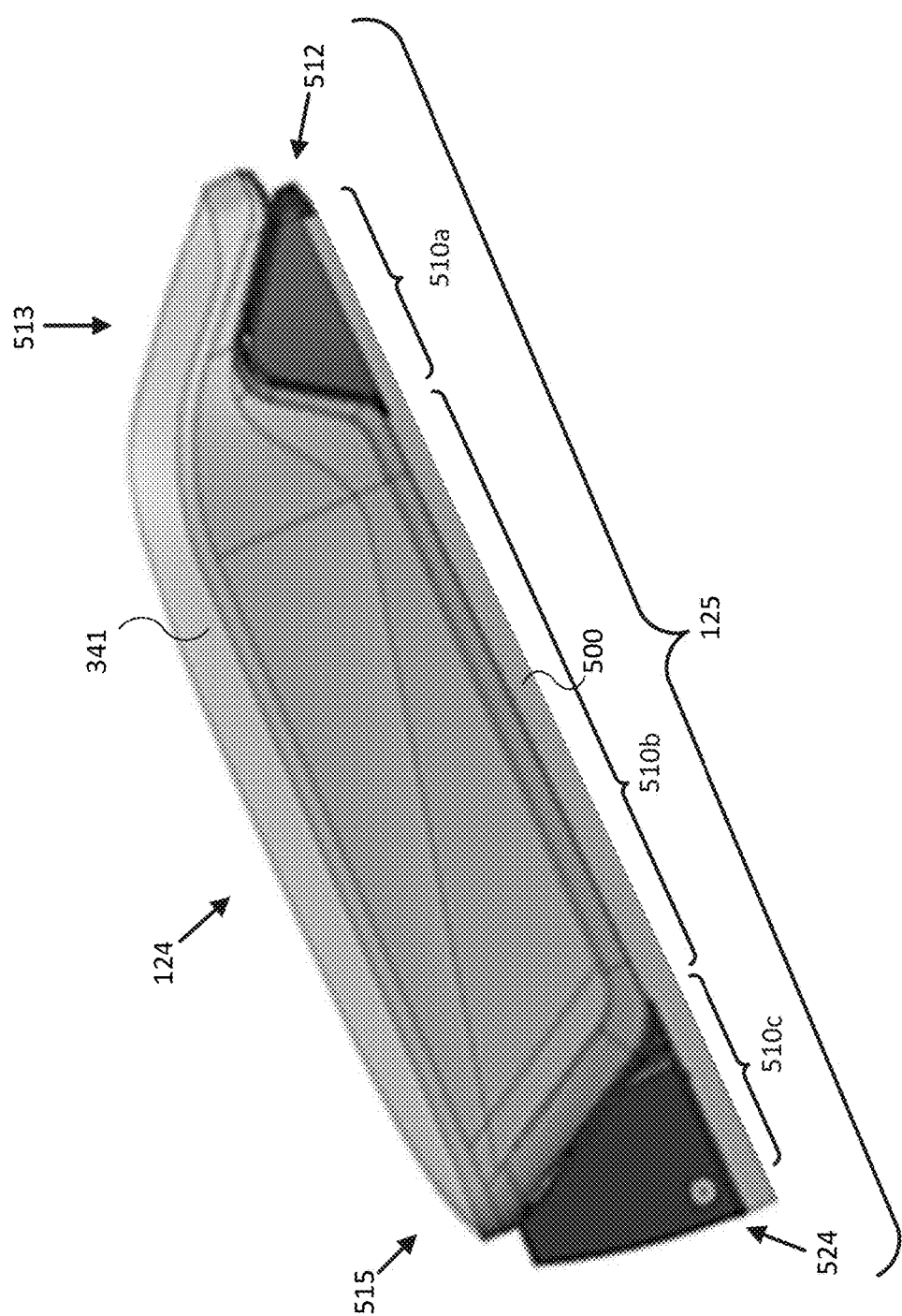

At block 408 of process 400, a first end 513 of a battery pack assembly 124 may be latched into the first securing assembly 512. For example, as shown in FIG. 5H, first end 513 of battery pack assembly 124 may be latched into first securing assembly 512. In some embodiments, battery pack assembly 124 may include a battery enclosure 341, a battery electrical interface (e.g., electrical interface 339 of FIG. 3C) to integrate with the electrical interface 534 of second securing assembly 524, and latching interfaces (e.g., latching interfaces 339 of FIG. 3C) configured to latch into latches of the securing assemblies 512 and 524.

At block 410 of process 400, a second end 515 of a battery pack assembly 124 may be latched into the second securing assembly. For example, as shown in FIG. 5H, second end 515 of battery pack assembly 124 may be latched into second securing assembly 524 such that battery pack assembly 124 is latched between first securing assembly 512 and second securing assembly 524.

Battery pack assembly 124 may be disposed on an intermediate portion 510b of the mounting surface 502 of mounting rail 500 between first portion 510a and second portion 510c. As shown in the embodiment of FIG. 5A, intermediate portion 510b may extend laterally less than first portion 510a and second portion 510c. In various embodiments, battery pack assembly 124 may be disposed on intermediate portion 510 such that battery pack assembly 124 is within bounds defined by lateral extension of intermediation portion 510a. In some embodiments, intermediate portion 510a may have a scalloped notch on each side (e.g., scalloped notch 504 depicted in FIG. 5A), and battery pack assembly 124 may be disposed on intermediate portion 510 such that battery pack assembly 124 is within bounds defined by an inner edge of each of the scalloped notches defined in mounting surface 502. In some cases, battery pack assembly 124 is disposed on intermediate portion 510b within bounds of intermediate portion 510b to minimize overhang of battery pack assembly 124.

At block 412 of process 400, battery pack assembly 124 may be electrically coupled to the propulsion system 122 of the micro-mobility transit vehicle 110. For example, at block 410 when the second end 515 of battery pack assembly 124 is latched into second securing assembly 524, a battery electrical interface of battery pack assembly 124 may be electrically coupled to electrical interface 534 of second securing assembly 524. As such, the battery of battery pack assembly 124 may be electrically coupled to the propulsion system 122 of the micro-mobility transit vehicle 110 via the connections discussed above. As such, the battery may power micro-mobility transit vehicle 110.

Figure 5I:
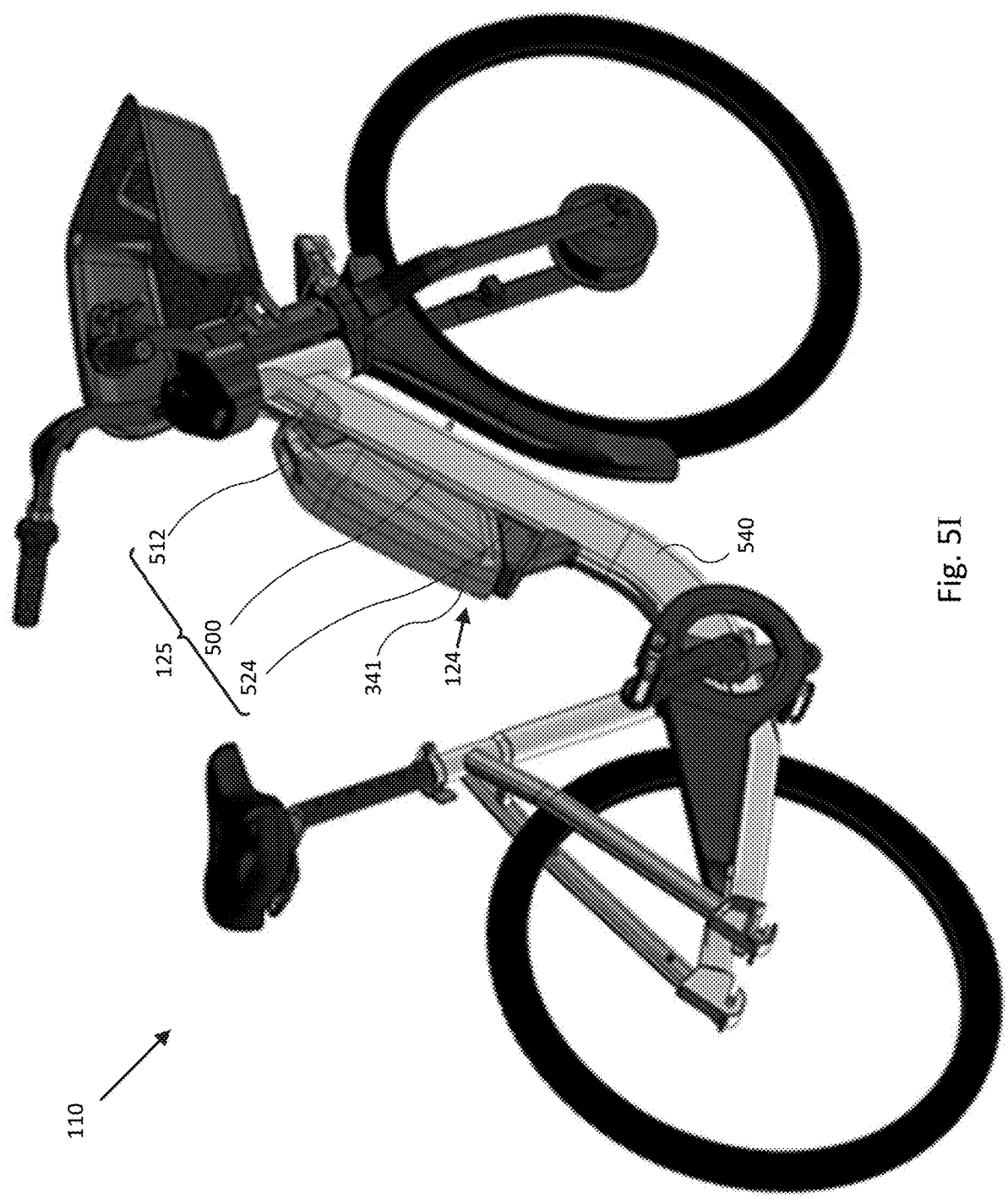

In an embodiment shown in FIG. 5I, a battery mount assembly 125 assembled according to various steps of process 400 may be installed on micro-mobility transit vehicle 110.

Figure 6:
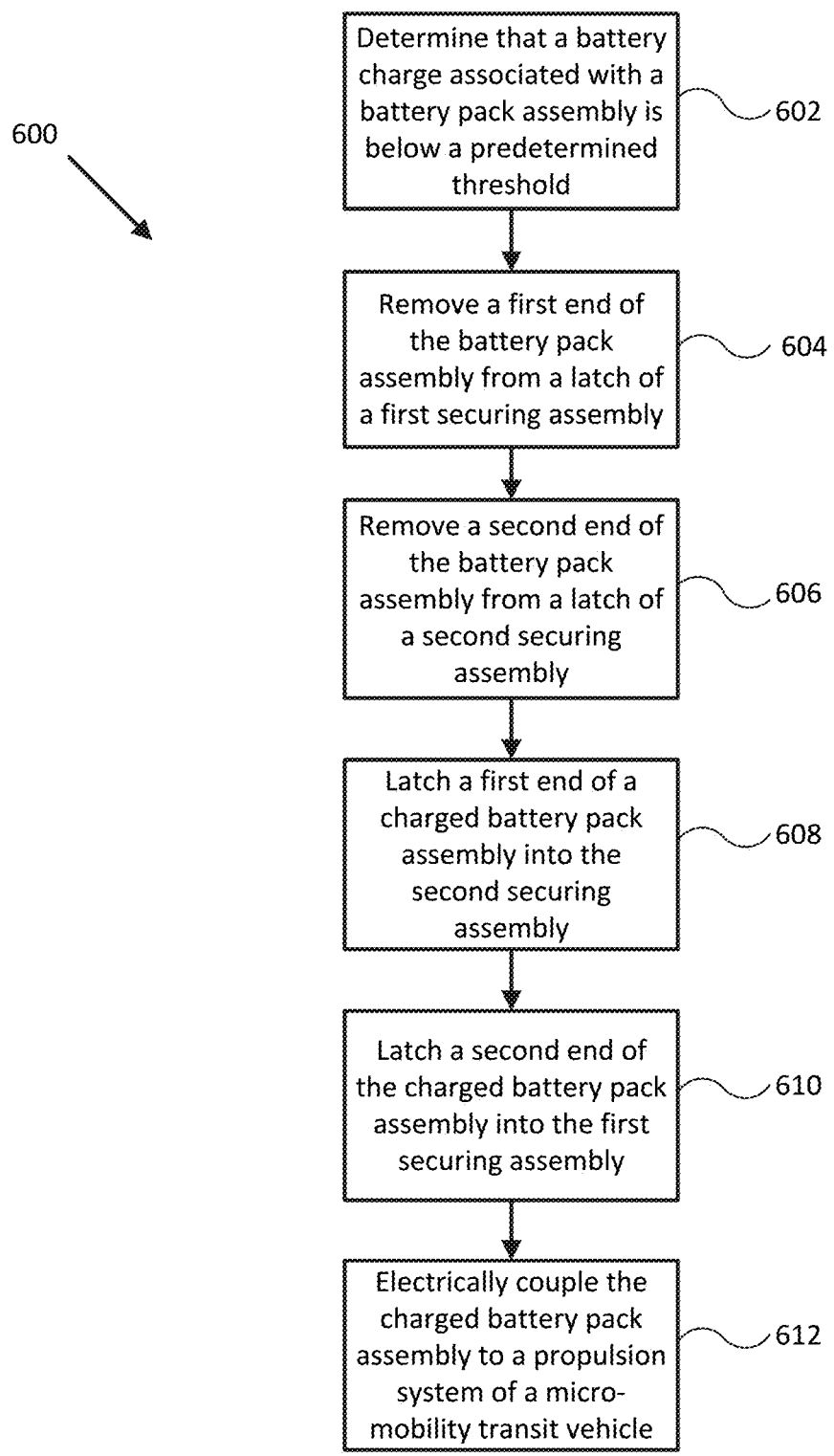
FIG. 6 illustrates a flow diagram of a process for replacing a battery of a battery mount assembly in accordance with one or more embodiments of the disclosure.

FIG. 6 illustrates a flow diagram of a process 600 for using a battery mount assembly 125 in accordance with an embodiment of the disclosure. It should be appreciated that any step, sub-step, sub-process, or block of process 600 may be performed in an order or arrangement different from the embodiments illustrated by FIG. 6. For example, in other embodiments, one or more blocks may be omitted from or added to the process. For illustrative purposes, process 600 is described in reference to FIGS. 3C and 5A-5I but the following description of process 600 may generally be applied to the additional figures disclosed herein. It is noted that "first," "second," etc. may be used as labels for nouns that they precede for explanatory purposes in the disclosure and do not necessarily imply any type of ordering (e.g., spatial, temporal, logical, cardinal, etc.).

At block 602, a battery charge of battery 315 of battery pack assembly 124 is determined to be below a predetermined threshold. For example, a computing device 309 of transit vehicle 110 may use one or more communications modules 120 of the transit vehicle 110 to establish a communication with communication modules 325 of a battery pack computing device 313 of battery pack assembly 124. The computing device 309 of the transit vehicle 110 may request a current battery charge state from battery charge module 319 of the battery pack computing device 313. In response to the request for the current battery charge state, the battery pack computing device 313 may read out a charge from battery charge module 319 electrically coupled to the battery 315. For example, a voltage, charge, and/or current may be read out using the battery charge module 319. The battery pack computing device 313 may provide the read out to the computing device 309 of the transit vehicle 110. The computing device 309 of the transit vehicle 110 may determine whether the read out is below a predetermined threshold charge amount indicating that the battery 315 requires charging or replacement.

In some embodiments, the battery pack computing device 313 may determine whether the read out is below the predetermined threshold charge amount and provide a result to the computing device 309 of the transit vehicle 110, a dock computing device 311, or management system 240 via the battery pack computing device's 313 communication modules 325. For example, the battery pack computing device 313 may calculate a battery percentage indicating a current state of the battery 315, compare the battery percentage to a threshold percentage such as, for example, 20% to determine whether the current state of the battery 315 indicates that the battery 315 requires replacement or charging.

After it is determined that the battery charge is below the predetermined threshold indicating that battery charging or replacement would be required, process 600 proceeds to block 604. At block 604, a first end 513 of the battery pack assembly 124 is removed from a latch 518 of a first securing assembly 512 of a battery mount assembly 125. In some embodiments, the latch 518 of the first securing assembly 512 may be electromechanically disengaged after a computing device (e.g., on printed circuit board 516) of the first securing assembly 512 receives a wireless communication key such as a signal provided by an NFC tap.

At block 606, a second end 515 of the battery pack assembly 124 is removed from the latch of a second securing assembly 524. In some embodiments, the latch of the second securing assembly 524 may be electromechanically disengaged after a computing device of the second securing assembly 524 receives a wireless communication key such as another NFP tap. In other embodiments, the latch of the second securing assembly 524 may be electromechanically disengaged synchronously with the latch of the first securing assembly 512, such as when the first securing assembly 512 receives the aforementioned wireless communication key.

In various embodiments, the latches of the first securing assembly 512 and the second securing assembly 524 may be configured to receive a physical key to mechanically engage and disengage the latching mechanisms thereof.

At block 608, a first end of a charged and/or replacement battery pack assembly may be latched into the first securing assembly. In some cases, the charged battery pack assembly may be the same battery pack assembly 124 that was removed but now has a charge. In other cases, the charged battery pack assembly may be a different battery pack assembly with a charge greater than the charge of the removed battery pack assembly 124.

At block 610, a second end of the charged battery pack assembly may be latched into the second securing assembly 524 such that the charged battery pack assembly is disposed between the securing assemblies 512 and 524.

At block 612, the charged battery pack assembly may be electrically coupled to a propulsion system 122 of a micro-mobility transit vehicle 110 via various wires as discussed with reference to process 400.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A battery mount assembly configured to receive a battery pack assembly to propel a micro-mobility transit vehicle, the battery mount assembly comprising:
    a mounting rail comprising:
        a first side comprising a contoured surface configured to align with a complementary contoured surface of a frame of the micro-mobility transit vehicle;
        a second side comprising a battery mounting surface opposite the first side and configured to receive a first securing assembly and a second securing assembly entirely disposed thereon and separately spaced to receive the battery pack assembly therebetween, wherein the battery mounting surface comprises a plurality of through-holes configured to receive one or more fasteners for coupling the battery mounting surface to the frame and a plurality of channels defined longitudinally within the battery mounting surface and configured to receive one or more wires extending between the first securing assembly and the second securing assembly; and
    an intermediate portion of the battery mounting surface disposed between a first portion and a second portion of the battery mounting surface, wherein the intermediate portion comprises a substantially planar surface, wherein the intermediate portion of the battery mounting surface comprises a first notch defined along a first length of the intermediate portion and a second notch defined along a second length of the intermediate portion, and wherein a first width of the intermediate portion corresponding to the first notch defined along the first length and a second width of the intermediate portion corresponding to the second notch defined along the second length are less than a width of the first portion and a width of the second portion.

2. The battery mount assembly of claim 1, further comprising:
    the first securing assembly entirely disposed on the first portion of the battery mounting surface and configured to latch a first end of the battery pack assembly to the battery mount assembly.

3. The battery mount assembly of claim 2, further comprising:
    the second securing assembly entirely disposed on the second portion of the battery mounting surface and configured to latch a second end of the battery pack assembly to the battery mount assembly.

4. The battery mount assembly of claim 3, further comprising:
    the battery pack assembly latched to the battery mount assembly between the first securing assembly and the second securing assembly and disposed on the intermediate portion of the battery mounting surface between the first portion and the second portion of the battery mounting surface.

5. The battery mount assembly of claim 4, wherein the second securing assembly comprises:
    a wiring harness configured to electrically couple the battery pack assembly to a propulsion system of the micro-mobility transit vehicle via a wire of the wiring harness that extends into the frame of the micro-mobility transit vehicle and connects to the propulsion system.

6. The battery mount assembly of claim 4, wherein the intermediate portion of the battery mounting surface extends laterally less than the first portion and the second portion of the battery mounting surface, and wherein the battery pack assembly is within bounds defined by a lateral extension of the intermediate portion of the battery mounting surface.

7. The battery mount assembly of claim 6, wherein the first notch comprises a first scalloped notch and the second notch comprises a second scalloped portion, and wherein the battery pack assembly is within bounds defined by an inner edge of the first scalloped notch defined along the first side and an inner edge of the second scalloped notch defined along the second side.

8. The battery mount assembly of claim 1, wherein the mounting rail extends substantially longitudinal along the contoured surface of the first side.

9. The battery mount assembly of claim 1, wherein the contoured surface and the complementary contoured surface are substantially arcuate, and wherein the complementary contoured surface corresponds to a tube of the frame of the micro-mobility transit vehicle.

10. A micro-mobility transit vehicle comprising the battery mount assembly of claim 1, wherein the contoured surface of the first side of the mounting rail aligns with the complementary contoured surface of a tube of the frame of the micro-mobility transit vehicle to fasten the mounting rail to the tube of the frame of the micro-mobility transit vehicle.

11. The battery mount assembly of claim 1, wherein the battery mount assembly includes the battery pack assembly, and wherein the battery pack assembly further includes:
    a battery; and
    a charge reading device configured to detect when a charge of the battery is below a predetermined threshold.

12. The battery mount assembly of claim 11, wherein a first end of the battery pack assembly is latched to the first securing assembly, and wherein a second end of the battery pack assembly is latched to the second securing assembly.

13. The battery mount assembly of claim 11, wherein the battery pack assembly is configured to be swappable with a charged battery pack assembly.

14. A method for providing a battery mount assembly configured to receive a battery pack assembly for propelling a micro-mobility transit vehicle, the method comprising:
providing a mounting rail, wherein the mounting rail comprises:
a first side comprising a contoured surface configured to align with a complementary contoured surface of a frame of the micro-mobility transit vehicle;
a second side comprising a battery mounting surface opposite the first side and configured to receive a first securing assembly and a second securing assembly entirely disposed thereon and separately spaced to receive the battery pack assembly therebetween, wherein the battery mounting surface comprises a plurality of through-holes configured to receive one or more fasteners for coupling the battery mounting surface to the frame and a plurality of channels defined longitudinally within the battery mounting surface and configured to receive one or more wires extending between the first securing assembly and the second securing assembly; and
an intermediate portion of the battery mounting surface disposed between a first portion and a second portion of the battery mounting surface, wherein the intermediate portion comprises a substantially planar surface, wherein the intermediate portion of the battery mounting surface comprises a first notch defined along a first length of the intermediate portion and a second notch defined along a second length of the intermediate portion, and wherein a first width of the intermediate portion corresponding to the first notch defined along the first length and a second width of the intermediate portion corresponding to the second notch defined along the second length are less than a width of the first portion and a width of the second portion.

15. The method of claim 14, further comprising:
providing the battery pack assembly for propelling the micro-mobility transit vehicle,
wherein the battery pack assembly is disposed on the intermediate portion of the battery mounting surface defined between the first portion and the second portion of the battery mounting surface, and wherein a width of the battery pack assembly is within bounds defined by a lateral extension of the intermediate portion.

16. The method of claim 15,
wherein the battery pack assembly is further coupled to a propulsion system of the micro-mobility transit vehicle via a wire of a wiring harness, and wherein the wire extends into a hollow portion of the frame of the micro-mobility transit vehicle and connects to the propulsion system.

17. The method of claim 15, wherein the contoured surface of the mounting rail and the complementary contoured surface of a tube of the frame are substantially arcuate.

18. The method of claim 14, wherein the mounting rail extends substantially longitudinal along the contoured surface of the first side.

19. The method of claim 14, wherein the contoured surface and the complementary contoured surface are substantially arcuate, and wherein the complementary contoured surface corresponds to a tube of the frame of the micro-mobility transit vehicle.

20. The method of claim 14, wherein the battery pack assembly is latched to the battery mount assembly between the first securing assembly and the second securing assembly.

* * * * *